United States Patent
Zhang et al.

(10) Patent No.: US 11,995,900 B2
(45) Date of Patent: May 28, 2024

(54) METHOD ON IDENTIFYING INDICIA ORIENTATION AND DECODING INDICIA FOR MACHINE VISION SYSTEMS

(71) Applicant: ZEBRA TECHNOLOGIES CORPORATION, Lincolnshire, IL (US)

(72) Inventors: Yan Zhang, Buffalo Grove, IL (US); Denghui Xiao, Shanghai (CN)

(73) Assignee: Zebra Technologies Corporation, Lincolnshire, IL (US)

(*) Notice: Subject to any disclaimer, the term of this patent is extended or adjusted under 35 U.S.C. 154(b) by 376 days.

(21) Appl. No.: 17/524,983

(22) Filed: Nov. 12, 2021

(65) Prior Publication Data
US 2023/0154212 A1 May 18, 2023

(51) Int. Cl.
*G06V 20/62* (2022.01)
*G06F 18/2413* (2023.01)
*G06N 3/02* (2006.01)
*G06T 7/60* (2017.01)
*G06T 7/70* (2017.01)

(52) U.S. Cl.
CPC ........ *G06V 20/63* (2022.01); *G06F 18/24137* (2023.01); *G06N 3/02* (2013.01); *G06T 7/60* (2013.01); *G06T 7/70* (2017.01)

(58) Field of Classification Search
CPC .. G06V 20/63; G06V 10/242; G06V 2201/06; G06V 10/25; G06F 18/24137; G06N 3/02; G06N 3/04; G06N 20/00; G06T 7/60; G06T 7/70
USPC ....................................................... 382/181
See application file for complete search history.

(56) References Cited

U.S. PATENT DOCUMENTS

| | | | | |
|---|---|---|---|---|
| 6,266,442 | B1 * | 7/2001 | Laumeyer | G06V 10/443 382/104 |
| 8,116,527 | B2 * | 2/2012 | Sabol | G06T 7/254 382/270 |
| 8,665,079 | B2 * | 3/2014 | Pawlicki | G01S 13/867 340/436 |

(Continued)

FOREIGN PATENT DOCUMENTS

| | | | | |
|---|---|---|---|---|
| CA | 2734613 A1 * | 2/2010 | | G05D 23/1905 |
| WO | WO-2022175602 A1 * | 8/2022 | | |

OTHER PUBLICATIONS

International Search Report and Written Opinion for International Patent No. PCT/US2022/43455 dated Jan. 13, 2023.

*Primary Examiner* — Mahendra R Patel

(57) ABSTRACT

A method and system for performing indicia recognition includes obtaining, at an image sensor, an image of an object of interest and identifying at least one region of interest in the image. The region of interest contains one or more indicia indicative of the object of interest. The processor then determines positions of each region of interest and further determines a geometric shape based on the positions of each of the regions of interest. An orientation classification is identified for each region of interest is based on a respective position relative to the geometric shape for reach region of interest. The processor then identifies and performs one or more transformations for each region of interest, with each transformation determined by each regions respective orientation classification. The processor then performs indicia recognition on each of the one or more transformed regions of interest.

24 Claims, 10 Drawing Sheets

(56) References Cited

U.S. PATENT DOCUMENTS

| | | | |
|---|---|---|---|
| 8,885,229 B1* | 11/2014 | Amtrup | H04N 1/00801 |
| | | | 358/1.18 |
| 10,102,446 B2* | 10/2018 | Jaber | G06V 10/462 |
| 10,621,472 B1* | 4/2020 | Buibas | G06T 3/10 |
| 11,606,516 B2* | 3/2023 | Takahashi | H04N 23/617 |
| 11,625,550 B2* | 4/2023 | Wang | G06K 7/12 |
| | | | 235/455 |
| 11,625,805 B2* | 4/2023 | Alattar | G06F 21/16 |
| | | | 382/100 |
| 11,648,945 B2* | 5/2023 | Sajjadi Mohammadabadi | |
| | | | G06F 18/251 |
| | | | 382/104 |
| 2002/0044689 A1* | 4/2002 | Roustaei | G06K 7/10732 |
| | | | 382/199 |
| 2008/0008377 A1* | 1/2008 | Andel | G06V 10/50 |
| | | | 382/141 |
| 2011/0200256 A1* | 8/2011 | Saubat | G06V 30/1448 |
| | | | 382/195 |
| 2020/0202134 A1* | 6/2020 | Bulzacki | G06V 10/764 |
| 2020/0225673 A1* | 7/2020 | Ebrahimi Afrouzi | |
| | | | G05D 1/0016 |
| 2020/0380229 A1* | 12/2020 | Peruch | G06K 7/1447 |

* cited by examiner

METHOD ON IDENTIFYING INDICIA ORIENTATION AND DECODING INDICIA FOR MACHINE VISION SYSTEMS

BACKGROUND

Machine vision technologies provide a means for image-based inspection and analysis for applications ranging from automatic part inspection, process control, robotic guidance, part identification, barcode reading, and many others. Machine vision technologies rely on capturing and processing images for performing specific analysis or tasks which often require both the integrated use of imaging systems as well as processing systems.

Industrial machine vision (IMV) may be useful for monitoring and classifying inventory in a warehouse, along a production line, or at a receiving bay. Therefore, a means for identifying parts and products for IMV is necessary. Optical character recognition (OCR) is a technique that identifies and converts text and characters captured in images into electronic representation of the text or characters. Many identifiers for parts, such as VINs on cars or serial numbers, include characters that appear in linear, or nearly straight, horizontally oriented lines, that are recognizable using conventional OCR techniques.

IMV and OCR techniques often fail, or have a very low scanning success rate, when attempting to identify characters or text that are not in substantially linear orientations. Some applications have allowed for machine learning to be used to assist in improving scanning and character recognition success rates which requires additional processing resources, time, money, image samples, and may only be applied to specialized machine vision systems. Additionally, machine learning techniques for IMV and OCR are not typically robust and require very specific character and image parameters.

As such, it could be beneficial for a machine vision system to implement OCR or another character recognition that is efficient and highly successful at recognizing text and/or characters that are not in substantially linear and horizontal orientations.

SUMMARY

In an embodiment, the present invention is a method of performing indicia recognition for an imaging system. The method comprises obtaining, by an imaging sensor, an image of an object of interest, identifying, by a processor, one or more regions of interest in the image, each region of interest including one or more indicia indicative of a characteristic of the object of interest, determining, by the processor, positions of each of the one or more regions of interest in the image, determining, by the processor, a geometric shape from the determined positions of the one or more regions of interest, identifying, by the processor, an orientation classification to each of the one or more regions of interest, the orientation classification being identified based on the (i) determined positions and (ii) determined geometric shape, identifying, by the processor, a geometric transformation for each of the identified orientations and transforming, by the processor, each of the one or more regions of interest according to the geometric transformation for the identified orientation classification to provide a perspective normalization for each of the one or more regions of interest, and responsive to the transforming, performing, by the processor, indicia recognition on each of the one or more regions of interest.

In a variation of the current embodiment, the positions of each of the one or more regions of interest are determined by a centroid of each of the one or more regions of interest. In another variation of the current embodiment, the positions of each of the one or more regions of interest are determined by one or more vertices of each region of interest, wherein the region of interest is a polygon.

In yet another variation of the current embodiment, identifying an orientation classification for each of the one or more regions of interest comprises determining, by the processor, a plurality of quadrants of the geometric shape, identifying, by the processor, the location of each of the one or more regions of interest within a respective quadrant, and determining, by the processor, the orientation classification for each of the one or more regions of interest from the identified locations of the one or more regions of interest in respective quadrants.

In another variation of the current embodiment, identifying one or more regions of interest in the image comprises applying, by the processor, a deep neural network model to identify indicia in the image, and determining, by the processor, the one or more regions of interest from locations of the identified indicia in the image. Further, in a variant of the current embodiment, performing indicia recognition on each of the one or more regions of interest comprises performing, by the processor, text recognition by applying a deep neural network model.

Another embodiment of the present invention is an imaging system for performing indicia recognition. The system comprises an imaging sensor disposed to (i) receive light from a target and (ii) generate a signal indicative of the receive light, and a processor and computer-readable media storing machine readable instructions that, when executed, cause the imaging system to obtain, by the imaging sensor, an image of an object of interest, identify, by the processor, one or more regions of interest in the image, each region of interest including one or more indicia indicative of a characteristic of the object of interest, determine, by the processor, positions of each of the one or more regions of interest in the image, determine, by the processor, a geometric shape from the determined positions of the one or more regions of interest, identify, by the processor, an orientation classification to each of the one or more regions of interest, the orientation classification being identified based on the (i) determined positions and (ii) determined geometric shape, identify, by the processor, a geometric transformation for each of the identified orientations, transform, by the processor, each of the one or more regions of interest according to the geometric transformation for the identified orientation classification to provide a perspective normalization for each of the one or more regions of interest, and perform, by the processor and responsive to the transformation, indicia recognition on each of the one or more regions of interest.

In a variation of the current embodiment, to determine positions of each of the one or more regions of interest the machine readable instructions further cause the imaging system to determine, by the processor, a centroid of each of the one or more regions of interest, and determine, by the processor, the positions of each of the one or more regions of interest from the centroid of each region of interest. In another variation of the current embodiment, to determine positions of each of the one or more regions of interest the machine readable instructions further cause the imaging system to determine, by the processor, one or more vertices of each region of interest, and determine, by the processor, the positions of each of the one or more regions of interest from the one or more vertices of each region of interest.

In yet another variation of the current embodiment, to identify an orientation classification for each of the one or more regions of interest, the machine readable instructions further cause the imaging system to determine, by the processor, a plurality of quadrants of the geometric shape, identify, by the processor, the location of each of the one or more regions of interest within a respective quadrant, and determine, by the processor, the orientation classification for each of the one or more regions of interest from the identified locations of the one or more regions of interest in respective quadrants.

In a further variation of the current embodiment, to identify one or more regions of interest in the image, the machine readable instructions further cause the imaging system to apply, by the processor, a deep neural network model to identify indicia in the image, and determine, by the processor, the one or more regions of interest from locations of the identified indicia in the image. In yet another variation of the current embodiment, to perform indicia recognition on each of the one or more regions of interest, the machine readable instructions further cause the imaging system to perform, by the processor, text recognition by applying a deep neural network model.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
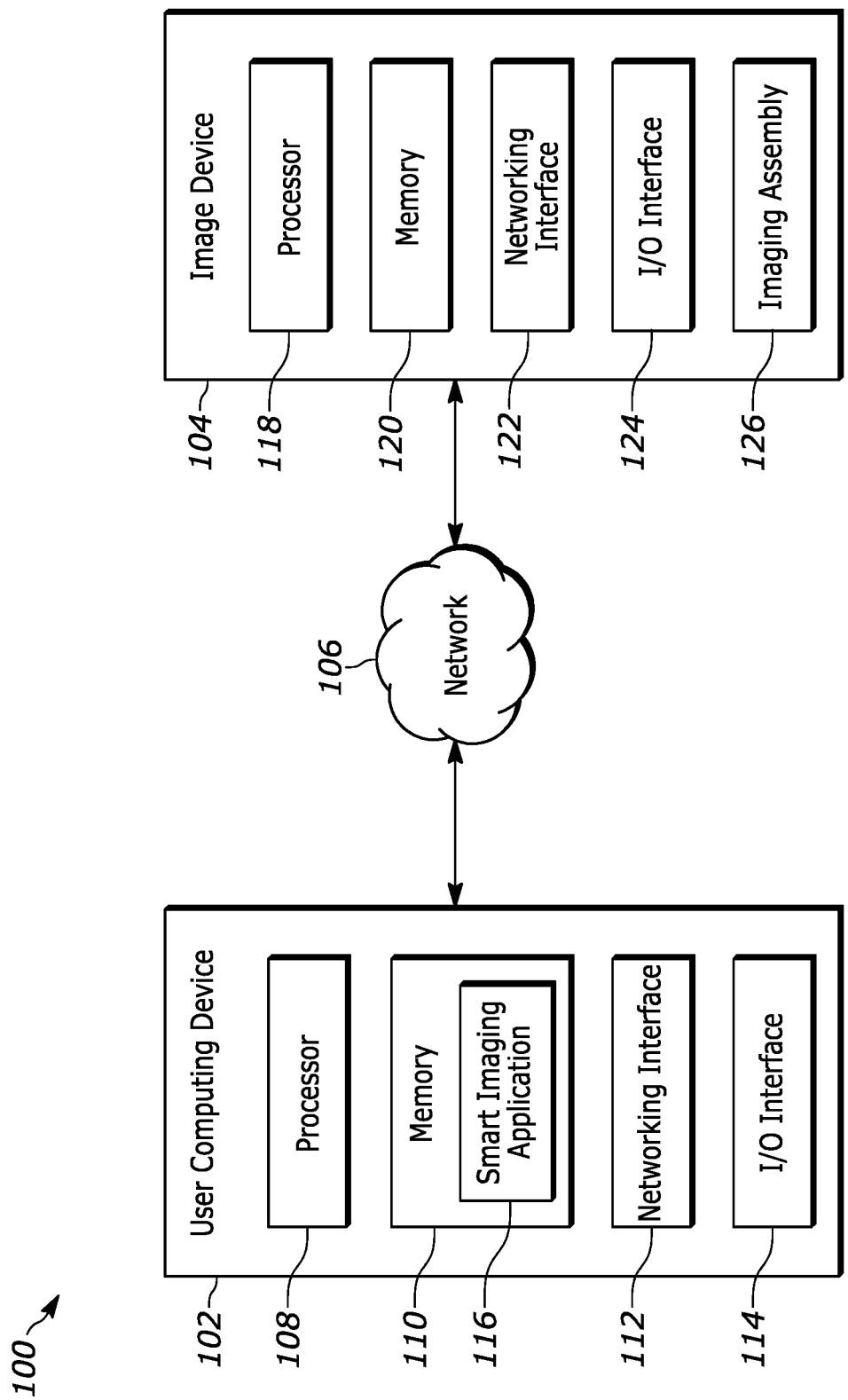
FIG. 1 illustrates an example imaging system configured to analyze an image of a target object to execute a machine vision job, in accordance with various embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Machine vision systems often require specific optical setups, with predetermined or known object orientations, and placements in a field of view of the imaging system. Further, any indicia such as letters, numbers, or other characters must typically be in a set orientation and substantially linear in orientation for machine vision systems to effectively identify the indicia. While machine vision is already implemented across a multitude of industries for performing text analysis, part cataloguing, part inspection, etc., an effective method and system for identifying indicia in arbitrary orientations and in non-linear arrangements would greatly increase the range of applications and industries that may utilize machine vision. Thus, the disclosed method and system provide a means for performing identification of indicia that have characters in various orientations and arrangements. As described herein, the embodiments of the present disclosure may provide for more robust machine vision analysis across a wide variety of applications. Further, the disclosed embodiments may further provide benefits as to reduce human analysis and input during automated processes, reduce computational complexity in image analysis, simplify required optics for performing imaging, and increase the versatility, scanning efficiency, and robustness of a machine vision system.

FIG. 1 illustrates an example imaging system 100 configured to analyze an image of a target object to execute a machine vision job, in accordance with various embodiments disclosed herein. More specifically, the imaging system 100 is configured to detect and identify indicia in a plurality of orientations and arrangements in an image. In the example embodiment of FIG. 1, the imaging system 100 includes a user computing device 102 and an imaging device 104 communicatively coupled to the user computing device 102 via a network 106. Generally speaking, the user computing device 102 and the imaging device 104 may be capable of executing instructions to, for example, implement operations of the example methods described herein, as may be represented by the flowcharts of the drawings that accompany this description. The user computing device 102 is generally configured to enable a user/operator to create a machine vision job for execution on the imaging device 104. When created, the user/operator may then transmit/upload the machine vision job to the imaging device 104 via the network 106, where the machine vision job is then interpreted and executed. The user computing device 102 may comprise one or more operator workstations, and may include one or more processors 108, one or more memories 110, a networking interface 112, an input/output (I/O) interface 114, and a smart imaging application 116.

The imaging device 104 is connected to the user computing device 102 via a network 106, and is configured to interpret and execute machine vision jobs received from the user computing device 102. Generally, the imaging device 104 may obtain a job file containing one or more job scripts from the user computing device 102 across the network 106 that may define the machine vision job and may configure the imaging device 104 to capture and/or analyze images in accordance with the machine vision job. For example, the imaging device 104 may include flash memory used for determining, storing, or otherwise processing imaging data/datasets and/or post-imaging data. The imaging device 104 may then receive, recognize, and/or otherwise interpret a trigger that causes the imaging device 104 to capture an image of the target object in accordance with the configuration established via the one or more job scripts. Once captured and/or analyzed, the imaging device 104 may transmit the images and any associated data across the network 106 to the user computing device 102 for further analysis and/or storage. In various embodiments, the imaging device 104 may be a "smart" camera and/or may otherwise be configured to automatically perform sufficient functionality of the imaging device 104 in order to obtain, interpret, and execute job scripts that define machine vision jobs, such as any one or more job scripts contained in one or more job files as obtained, for example, from the user computing device 102.

Broadly, the job file may be a JSON representation/data format of the one or more job scripts transferrable from the user computing device 102 to the imaging device 104. The job file may further be loadable/readable by a C++ runtime engine, or other suitable runtime engine, executing on the imaging device 104. Moreover, the imaging device 104 may run a server (not shown) configured to listen for and receive job files across the network 106 from the user computing device 102. Additionally or alternatively, the server configured to listen for and receive job files may be implemented as one or more cloud-based servers, such as a cloud-based computing platform. For example, the server may be any one or more cloud-based platform(s) such as MICROSOFT AZURE, AMAZON AWS, or the like.

In any event, the imaging device 104 may include one or more processors 118, one or more memories 120, a networking interface 122, an I/O interface 124, and an imaging assembly 126. The imaging assembly 126 may include a digital camera and/or digital video camera for capturing or taking digital images and/or frames. Each digital image may comprise pixel data, vector information, or other image data that may be analyzed by one or more tools each configured to perform an image analysis task. The digital camera and/or digital video camera of, e.g., the imaging assembly 126 may be configured, as disclosed herein, to take, capture, obtain, or otherwise generate digital images and, at least in some embodiments, may store such images in a memory (e.g., one or more memories 110, 120) of a respective device (e.g., user computing device 102, imaging device 104).

For example, the imaging assembly 126 may include a photo-realistic camera (not shown) for capturing, sensing, or scanning 2D image data. The photo-realistic camera may be an RGB (red, green, blue) based camera for capturing 2D images having RGB-based pixel data. In various embodiments, the imaging assembly may additionally include a three-dimensional (3D) camera (not shown) for capturing, sensing, or scanning 3D image data. The 3D camera may include an Infra-Red (IR) projector and a related IR camera for capturing, sensing, or scanning 3D image data/datasets. In some embodiments, the photo-realistic camera of the imaging assembly 126 may capture 2D images, and related 2D image data, at the same or similar point in time as the 3D camera of the imaging assembly 126 such that the imaging device 104 can have both sets of 3D image data and 2D image data available for a particular surface, object, area, or scene at the same or similar instance in time. In various embodiments, the imaging assembly 126 may include the 3D camera and the photo-realistic camera as a single imaging apparatus configured to capture 3D depth image data simultaneously with 2D image data. Consequently, the captured 2D images and the corresponding 2D image data may be depth-aligned with the 3D images and 3D image data.

In embodiments, the imaging assembly 126 may be configured to capture images of surfaces or areas of a predefined search space or target objects within the predefined search space. For example, each tool included in a job script may additionally include a region of interest (ROI) corresponding to a specific region or a target object imaged by the imaging assembly 126. The ROI may be a predefined ROI, or the ROI may be determined through analysis of the image by the processor 118. Further, a plurality of ROIs may be predefined or determined through image processing. The composite area defined by the ROIs for all tools included in a particular job script may thereby define the predefined search space which the imaging assembly 126 may capture in order to facilitate the execution of the job script. However, the predefined search space may be user-specified to include a field of view (FOV) featuring more or less than the composite area defined by the ROIs of all tools included in the particular job script. It should be noted that the imaging assembly 126 may capture 2D and/or 3D image data/ datasets of a variety of areas, such that additional areas in addition to the predefined search spaces are contemplated herein. Moreover, in various embodiments, the imaging assembly 126 may be configured to capture other sets of image data in addition to the 2D/3D image data, such as grayscale image data or amplitude image data, each of which may be depth-aligned with the 2D/3D image data. Further, one or more ROIs may be within a FOV of the imaging system such that any region of the FOV of the imaging system may be a ROI.

The imaging device 104 may also process the 2D image data/datasets and/or 3D image datasets for use by other devices (e.g., the user computing device 102, an external server). For example, the one or more processors 118 may process the image data or datasets captured, scanned, or sensed by the imaging assembly 126. The processing of the image data may generate post-imaging data that may include metadata, simplified data, normalized data, result data, status data, or alert data as determined from the original scanned or sensed image data. The image data and/or the post-imaging data may be sent to the user computing device 102 executing the smart imaging application 116 for viewing, manipulation, and/or otherwise interaction. In other embodiments, the image data and/or the post-imaging data may be sent to a server for storage or for further manipulation. As described herein, the user computing device 102, imaging device 104, and/or external server or other centralized processing unit and/or storage may store such data, and may also send the image data and/or the post-imaging data to another application implemented on a user device, such as a mobile device, a tablet, a handheld device, or a desktop device.

Each of the one or more memories 110, 120 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. In general, a computer program or computer based product, application, or code (e.g., smart imaging application 116, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the one or more processors 108, 118 (e.g., working in connection with the respective operating system in the one or more memories 110, 120) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

The one or more memories 110, 120 may store an operating system (OS) (e.g., Microsoft Windows, Linux, Unix, etc.) capable of facilitating the functionalities, apps, methods, or other software as discussed herein. The one or more memories 110 may also store the smart imaging application 116, which may be configured to enable machine vision job construction, as described further herein. Additionally, or alternatively, the smart imaging application 116 may also be stored in the one or more memories 120 of the imaging device 104, and/or in an external database (not shown), which is accessible or otherwise communicatively coupled to the user computing device 102 via the network 106. The one or more memories 110, 120 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a machine vision based imaging application, such as the smart imaging application 116, where each may be configured to facilitate their various functionalities discussed herein. It should be appreciated that one or more other applications may be envisioned and that are executed by the one or more processors 108, 118.

The one or more processors 108, 118 may be connected to the one or more memories 110, 120 via a computer bus responsible for transmitting electronic data, data packets, or otherwise electronic signals to and from the one or more processors 108, 118 and one or more memories 110, 120 in order to implement or perform the machine readable instructions, methods, processes, elements or limitations, as illustrated, depicted, or described for the various flowcharts, illustrations, diagrams, figures, and/or other disclosure herein.

The one or more processors 108, 118 may interface with the one or more memories 110, 120 via the computer bus to execute the operating system (OS). The one or more processors 108, 118 may also interface with the one or more memories 110, 120 via the computer bus to create, read, update, delete, or otherwise access or interact with the data stored in the one or more memories 110, 120 and/or external databases (e.g., a relational database, such as Oracle, DB2, MySQL, or a NoSQL based database, such as MongoDB). The data stored in the one or more memories 110, 120 and/or an external database may include all or part of any of the data or information described herein, including, for example, machine vision job images (e.g., images captured by the imaging device 104 in response to execution of a job script) and/or other suitable information.

The networking interfaces 112, 122 may be configured to communicate (e.g., send and receive) data via one or more external/network port(s) to one or more networks or local terminals, such as network 106, described herein. In some embodiments, networking interfaces 112, 122 may include a client-server platform technology such as ASP.NET, Java J2EE, Ruby on Rails, Node.js, a web service or online API, responsive for receiving and responding to electronic requests. The networking interfaces 112, 122 may implement the client-server platform technology that may interact, via the computer bus, with the one or more memories 110, 120 (including the applications(s), component(s), API(s), data, etc. stored therein) to implement or perform the machine readable instructions, methods, processes, elements or limitations, as illustrated, depicted, or described for the various flowcharts, illustrations, diagrams, figures, and/or other disclosure herein.

According to some embodiments, the networking interfaces 112, 122 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to network 106. In some embodiments, network 106 may comprise a private network or local area network (LAN). Additionally or alternatively, network 106 may comprise a public network such as the Internet. In some embodiments, the network 106 may comprise routers, wireless switches, or other such wireless connection points communicating to the user computing device 102 (via the networking interface 112) and the imaging device 104 (via networking interface 122) via wireless communications based on any one or more of various wireless standards, including by non-limiting example, IEEE 802.11a/b/c/g (WIFI), the BLUETOOTH standard, or the like.

The I/O interfaces 114, 124 may include or implement operator interfaces configured to present information to an administrator or operator and/or receive inputs from the administrator or operator. An operator interface may provide a display screen (e.g., via the user computing device 102 and/or imaging device 104) which a user/operator may use to visualize any images, graphics, text, data, features, pixels, and/or other suitable visualizations or information. For example, the user computing device 102 and/or imaging device 104 may comprise, implement, have access to, render, or otherwise expose, at least in part, a graphical user interface (GUI) for displaying images, graphics, text, data, features, pixels, and/or other suitable visualizations or information on the display screen. The I/O interfaces 114, 124 may also include I/O components (e.g., ports, capacitive or resistive touch sensitive input panels, keys, buttons, lights, LEDs, any number of keyboards, mice, USB drives, optical drives, screens, touchscreens, etc.), which may be directly/indirectly accessible via or attached to the user computing device 102 and/or the imaging device 104. According to some embodiments, an administrator or user/operator may access the user computing device 102 and/or imaging device 104 to construct jobs, review images or other information, make changes, input responses and/or selections, and/or perform other functions.

As described above herein, in some embodiments, the user computing device 102 may perform the functionalities as discussed herein as part of a "cloud" network or may otherwise communicate with other hardware or software components within the cloud to send, retrieve, or otherwise analyze data or information described herein.

Figure 2:
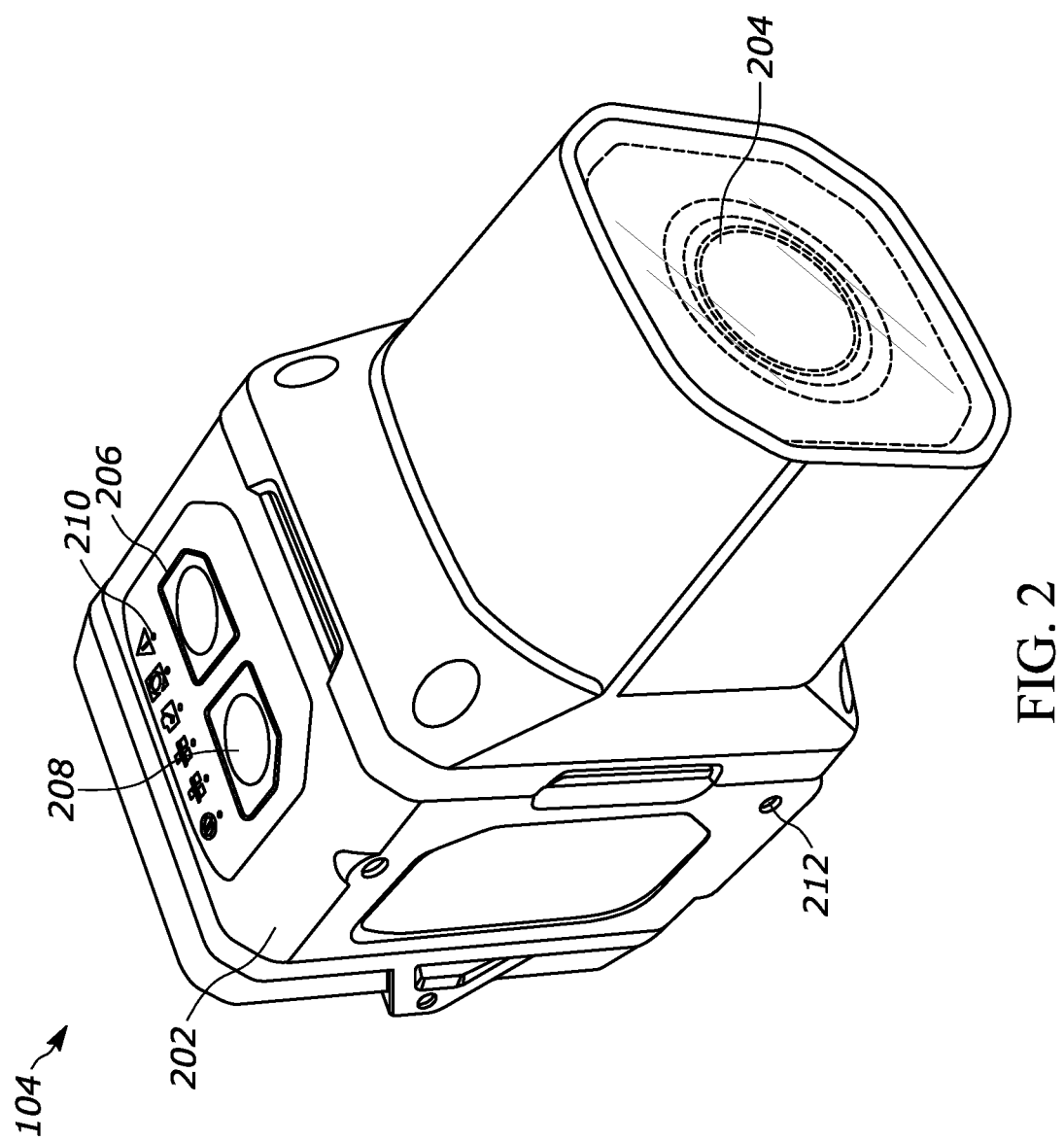
FIG. 2 is a perspective view of the imaging device of FIG. 1, in accordance with embodiments described herein.

FIG. 2 is a perspective view of an example imaging device 104 that may be implemented in the imaging system 100 of FIG. 1, in accordance with embodiments described herein. The imaging device 104 includes a housing 202, an imaging aperture 204, a user interface label 206, a dome switch/button 208, one or more light emitting diodes (LEDs) 210, and mounting point(s) 212. As previously mentioned, the imaging device 104 may obtain job files from a user computing device (e.g., user computing device 102) which the imaging device 104 thereafter interprets and executes. The instructions included in the job file may include device configuration settings (also referenced herein as "imaging settings") operable to adjust the configuration of the imaging device 104 prior to capturing images of a target object.

For example, the device configuration settings may include instructions to adjust one or more settings related to the imaging aperture 204. As an example, assume that at least a portion of the intended analysis corresponding to a machine vision job requires the imaging device 104 to maximize the brightness of any captured image. To accommodate this requirement, the job file may include device configuration settings to increase the aperture size of the imaging aperture 204. The imaging device 104 may interpret these instructions (e.g., via one or more processors 118) and accordingly increase the aperture size of the imaging aperture 204. Thus, the imaging device 104 may be configured to automatically adjust its own configuration to optimally conform to a particular machine vision job. Additionally, the imaging device 104 may include or otherwise be adaptable to include, for example but without limitation, one or more bandpass filters, one or more polarizers, one or more waveplates, one or more DPM diffusers, one or more C-mount lenses, and/or one or more C-mount liquid lenses over or otherwise influencing the received illumination through the imaging aperture 204.

The user interface label 206 may include the dome switch/button 208 and one or more LEDs 210, and may thereby enable a variety of interactive and/or indicative features. Generally, the user interface label 206 may enable a user to trigger and/or tune to the imaging device 104 (e.g., via the dome switch/button 208) and to recognize when one or more functions, errors, and/or other actions have been performed or taken place with respect to the imaging device 104 (e.g., via the one or more LEDs 210). For example, the trigger function of a dome switch/button (e.g., dome/switch button 208) may enable a user to capture an image using the imaging device 104 and/or to display a trigger configuration screen of a user application (e.g., smart imaging application 116). The trigger configuration screen may allow the user to configure one or more triggers for the imaging device 104 that may be stored in memory (e.g., one or more memories 110, 120) for use in later developed machine vision jobs, as discussed herein.

As another example, the tuning function of a dome switch/button (e.g., dome/switch button 208) may enable a user to automatically and/or manually adjust the configuration of the imaging device 104 in accordance with a preferred/predetermined configuration and/or to display an imaging configuration screen of a user application (e.g., smart imaging application 116). The imaging configuration screen may allow the user to configure one or more configurations of the imaging device 104 (e.g., aperture size, exposure length, etc.) that may be stored in memory (e.g., one or more memories 110, 120) for use in later developed machine vision jobs, as discussed herein.

To further this example, and as discussed further herein, a user may utilize the imaging configuration screen (or more generally, the smart imaging application 116) to establish two or more configurations of imaging settings for the imaging device 104. The user may then save these two or more configurations of imaging settings as part of a machine vision job that is then transmitted to the imaging device 104 in a job file containing one or more job scripts. The one or more job scripts may then instruct the imaging device 104 processors (e.g., one or more processors 118) to automatically and sequentially adjust the imaging settings of the imaging device in accordance with one or more of the two or more configurations of imaging settings after each successive image capture.

The mounting point(s) 212 may enable a user connecting and/or removably affixing the imaging device 104 to a mounting device (e.g., imaging tripod, camera mount, etc.), a structural surface (e.g., a warehouse wall, a warehouse ceiling, scanning bed or table, structural support beam, etc.), other accessory items, and/or any other suitable connecting devices, structures, or surfaces. For example, the imaging device 104 may be optimally placed on a mounting device in a distribution center, manufacturing plant, warehouse, and/or other facility to image and thereby monitor the quality/consistency of products, packages, and/or other items as they pass through the imaging device's 104 FOV. Moreover, the mounting point(s) 212 may enable a user to connect the imaging device 104 to a myriad of accessory items including, but without limitation, one or more external illumination devices, one or more mounting devices/brackets, and the like.

In addition, the imaging device 104 may include several hardware components contained within the housing 202 that enable connectivity to a computer network (e.g., network 106). For example, the imaging device 104 may include a networking interface (e.g., networking interface 122) that enables the imaging device 104 to connect to a network, such as a Gigabit Ethernet connection and/or a Dual Gigabit Ethernet connection. Further, the imaging device 104 may include transceivers and/or other communication components as part of the networking interface to communicate with other devices (e.g., the user computing device 102) via, for example, Ethernet/IP, PROFINET, Modbus TCP, CC-Link, USB 3.0, RS-232, and/or any other suitable communication protocol or combinations thereof.

Figure 3:
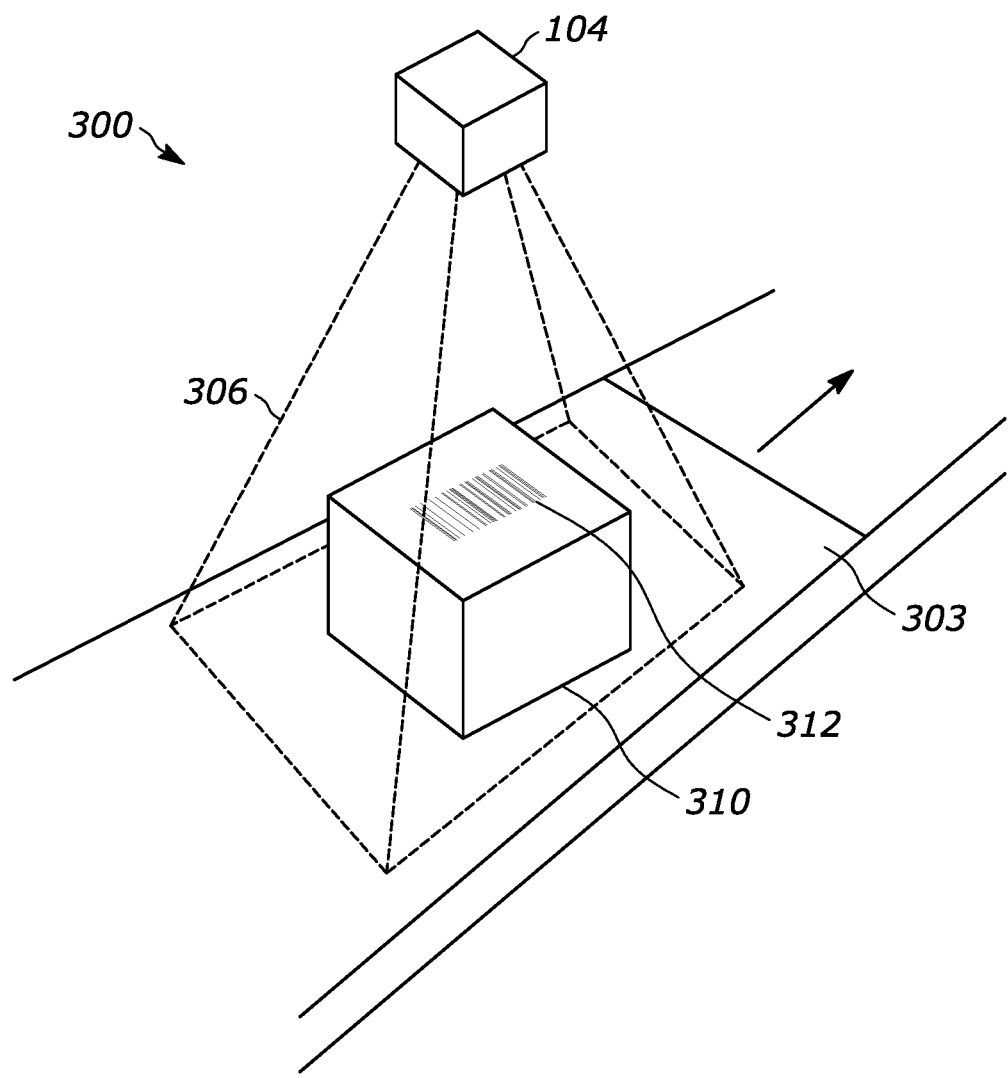
FIG. 3 illustrates an example environment for performing machine vision scanning of an object.

FIG. 3 illustrates an example environment 300 for performing machine vision scanning of an object as described herein. In the environment 300 of FIG. 3 the imaging device 104 of FIGS. 1 and 2 is position above a scanning surface 303. The imaging device 104 is disposed and oriented such that a field of view (FOV) 306 of the imaging device 104 includes a portion of the scanning surface 303. The scanning surface may be a table, podium, mount for mounting an object or part, a conveyer, a cubby hole, or another mount or surface that may support a part or object to be scanned. As illustrated, the scanning surface 303 is a conveyer belt having an object of interest 310 thereon. The object of interested 310 is illustrated as being within the FOV 306 of the imaging device 104. The object of interest 312 contains indicia 312 thereon. The imaging device 104 captures one or more images of the object of interest 310 and may determine a region of interest within the image that contains the object of interest, or the ROI may be determined as a region of the image that contains the indicia 312. As illustrated, the indicia 312 is a barcode, but the indicia 312 may include one or more of 1D barcode, 2D barcode, QR code, static barcode, dynamic barcode, alphabetical character, text, numerals, alphanumeric, other characters, a picture, vehicle identification number, expiration date, tire identification number, or another indicia having characters and/or numerals. In examples, the object of interest 310 may have more than one indicia, and the imaging device 104 may capture an image of the FOV 306 and determine multiple ROIs in the captured image, each ROI having at least one indicia for decoding.

The imaging device 104 may be mounted above the object of interest 310 on a ceiling, a beam, a metal tripod, or another object for supporting the position of the imaging device 104 for capturing images of the scanning bed 303. Further, the imaging device 104 may alternatively be mounted on a wall or another mount that faces objects on the scanning bed 303 from a horizontal direction. In examples, the imaging device 104 may be mounted on any apparatus or surface for imaging and scanning objects of interest that are in, or pass through, the FOV 306 of the imaging device 104.

The described method and system may be implemented for identifying text, numerals, or characters in any orientation, and any arrangement. For clarity and simplicity, a tire will be used as the object of interest 310. The tire having characters thereon in a radial pattern, with each character having a different angular orientation. The example of a tire with radially positioned characters is one example of the ability of the disclosed method and systems in identifying characters and indicia at any orientation and in arrangements other than horizontal linear arrangements. As used herein, "orientation" of a character or indicia refers to a rotational orientation relative to the imaging system, for example an upright letter A, a letter A rotated 90° clockwise, an upside down letter A, and a letter A rotated 270° clockwise all have different orientations. Further, a character may have an arbitrary orientation at any rotational angle in an image obtained by the imaging device 104. As used herein, "arrangement" refers to the arrangement of a plurality of characters or symbols used for indicia. For example, a word in a horizontal line, has a different arrangement as compared to a word in a vertical line in the FOV 306 of the imaging device 104. Further, indicia may include characters arranged in multiple horizontal or vertical lines, characters along a curve or contour, characters along a diagonal line, etc. The disclosed method and system may be used to efficiently scan and identify characters and indicia in any orientation and/or arrangement.

Figure 4:
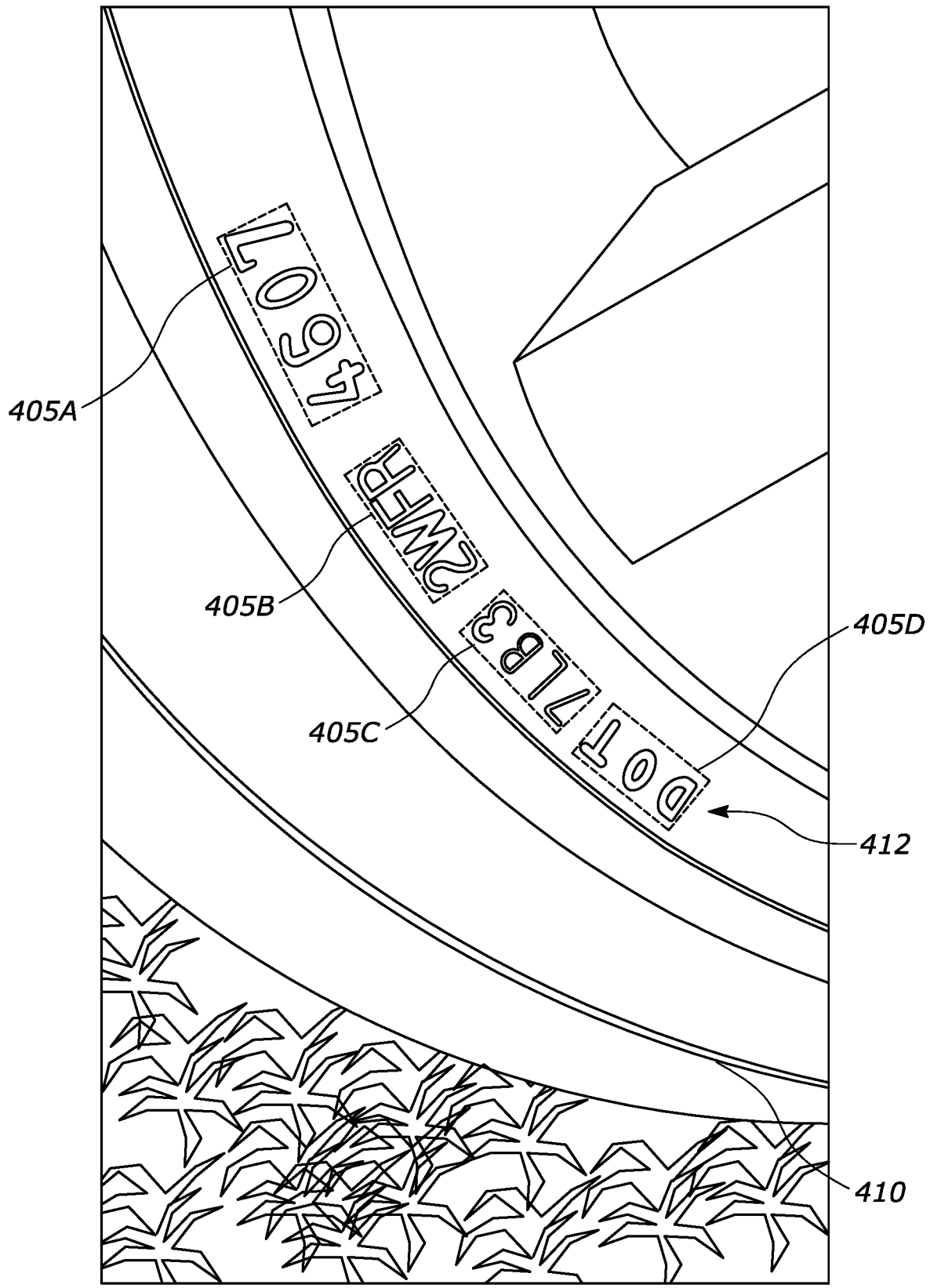
FIG. 4 illustrates a tire as an object of interest for performing machine vision analysis to identify indicia indicative of a characteristic or property of the tire.
Figure 5A:
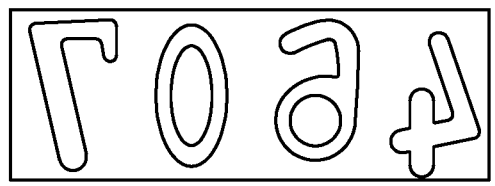
FIG. 5A illustrates indicia in a first region of interest as scanned by a conventional machine vision system.
Figure 5B:
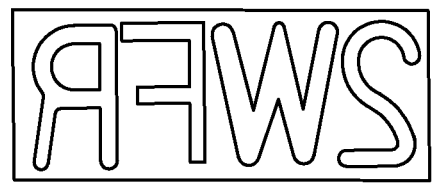
FIG. 5B illustrates indicia in a second region of interest as scanned by a conventional machine vision system.
Figure 5C:
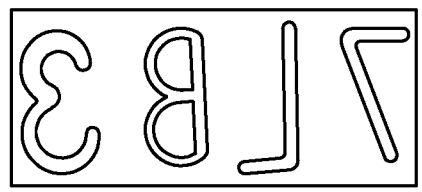
FIG. 5C illustrates indicia in a third region of interest as scanned by a conventional machine vision system.
Figure 5D:
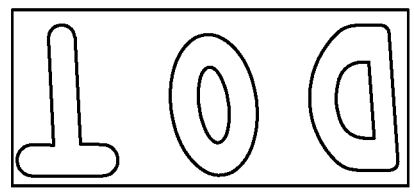
FIG. 5D illustrates indicia in a fourth region of interest as scanned by a conventional machine vision system.

FIG. 4 illustrates a tire 410 as the object of interest 310 for performing machine vision analysis on to identify indicia 412 indicative of one or more characteristics or properties of the tire 410. In the example of FIG. 4, the indicia 412 is a tire identification number (TID) that identifies where the tire was manufactured, the tire size, a manufacturers code, and the week and year the tire was manufactured. A TID may include a plurality of numbers and letters and the various format and codes of a TID may vary as manufacturers use different formats and codes. The tire 410 may be scanned in a manner similar to that illustrated in FIG. 3. For example, the tire 410 may be placed on the scanning bed 303 and the tire may ride along the conveyor belt of the scanning bed 303 through the FOV 306 of the imaging device 104. The tire 310 may be place on the scanning bed 303 with the indicia 412 facing the imaging device 104, but the tire may be placed on the scanning bed with the indicia 412 at an arbitrary orientation in the FOV 306. Therefore, to perform efficient scanning and decoding for machine vision, the imaging system 100 must be able to identify characters and symbols at any orientation of the tire 410 in the FOV 306.

Many machine vision systems require specific orientations and arrangements of indicia to efficiently scan and identify characters of the indicia. Therefore, many systems would not be able to identify any indicia contained in the example illustrated in FIG. 4. Some machine vision systems may be able to identify the presence of the indicia, but may not be able to properly perform OCR or identify characters of the indicia. FIGS. 5A-5D illustrate a conventional machine vision system that may identify the presence of indicia and identify regions of interest 405A-405D containing the indicia. For conventional systems, further processing using OCR is not able to properly identify the characters illustrated in FIGS. 5A-5D due to the orientations of the characters along the tire 410. For example, OCR is unable to identify the letters "DOT" from FIG. 5D as the letters are upside down and backwards in the obtained image.

Figure 6:
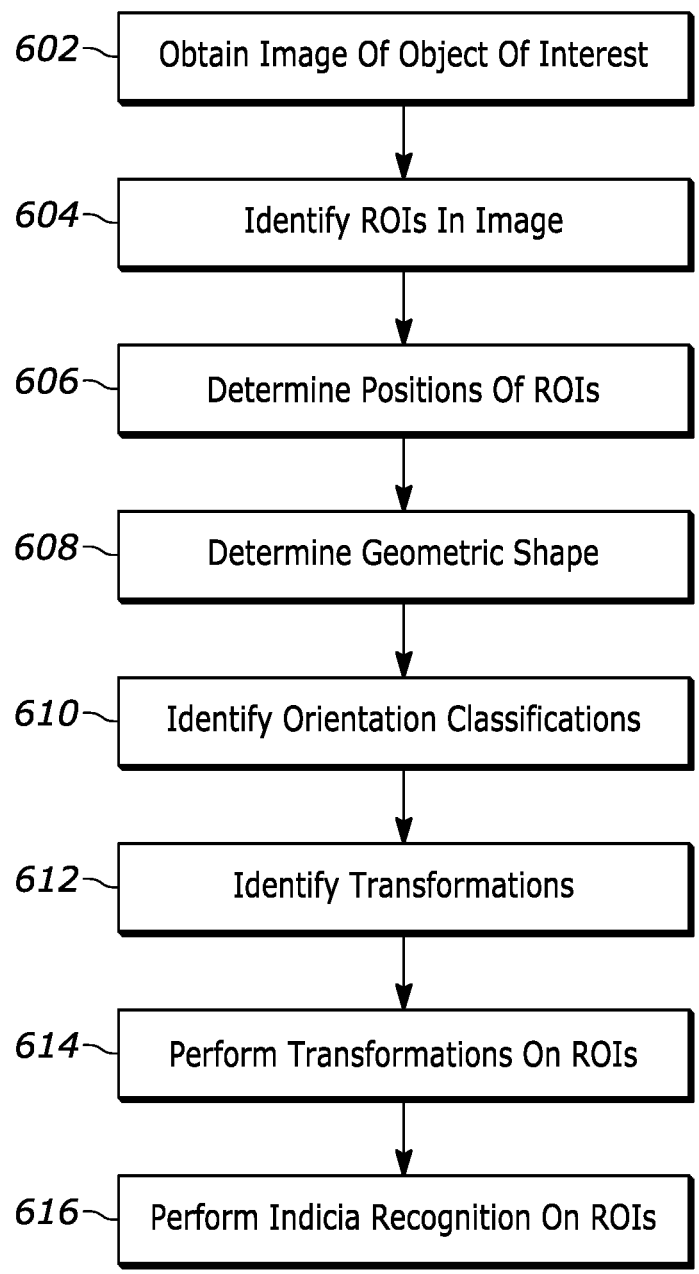
FIG. 6 is a flow diagram of a method for performing indicia recognition for an imaging system.
Figure 7:
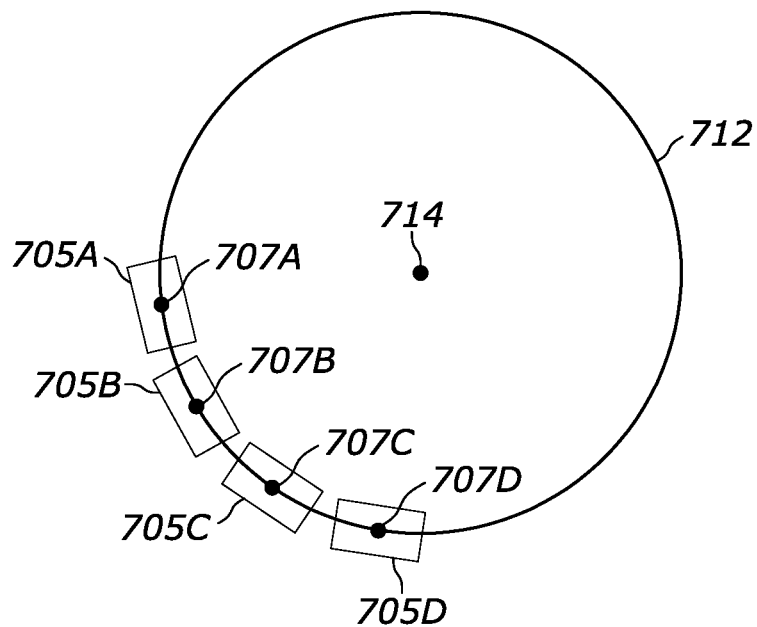
FIG. 7 illustrates example regions of interest and a geometric shape that may be determined using the method of FIG. 6.
Figure 8A:
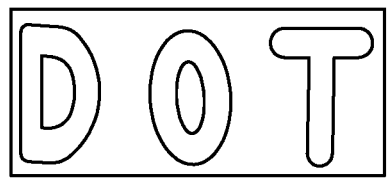
FIG. 8A illustrates a transformed region of interest and the resultant perspective normalization images of the first region of interest of FIG. 5A.
Figure 8B:
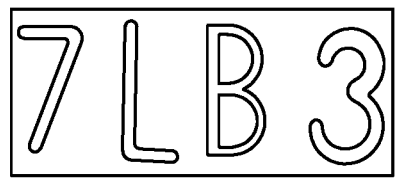
FIG. 8B illustrates a transformed region of interest and the resultant perspective normalization images of the second region of interest of FIG. 5B.
Figure 8C:
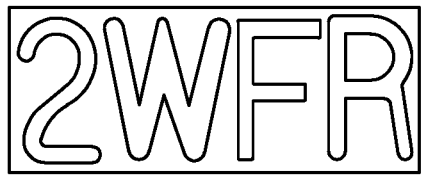
FIG. 8C illustrates a transformed region of interest and the resultant perspective normalization images of the third region of interest of FIG. 5C.
Figure 8D:
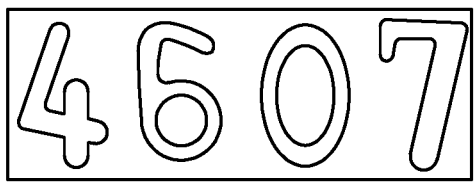
FIG. 8D illustrates a transformed region of interest and the resultant perspective normalization images of the fourth region of interest of FIG. 5D.

FIG. 6 is a flow diagram of a method 600 for performing indicia recognition for an imaging system, such as the imaging system 104 of FIGS. 1-3. For clarity, the tire 410 of FIG. 4 will be used as the object of interest 310. Further, FIG. 7 illustrates example ROIs 705A-705D and a geometric shape 712 that may be determined using the method 600 of FIG. 6. For clarity, the method 600 will be described with simultaneous reference to FIG. 7.

The method 600 includes obtaining an image of the object of interest 310 at 602. In the current example, the tire 410 is the object of interest 310 and the imaging device 104 obtains the image of the tire 410 as the tire 410 traverses the FOV 306 of the imaging device 104. The obtained image may include one or more frames of the FOV 306 for performing machine vision analysis and indicia recognition as described herein. A processor, such as the processor 118 or the processor 108 of FIG. 1, performs image processing on the obtained image and identifies one or more ROIs 705A-705D in the image at 604. Each of the ROIs 705A-705D includes one or more indicia indicative of one or more characteristics of the object of interest 310. For example, the tire 410 has four distinct groups of alphanumeric groups as illustrated in FIGS. 4 and 5A-5D, and the processor 108 may identify each ROI 705A-705D as containing one of the groups of characters. To identify the one or more ROIs, the processor may apply a deep neural network model to identify indicia in the image, and the determine the ROIs from the locations of the indicia in the image. In examples, the processor determines that text or characters are present in the image, without identifying the specific characters. Based on positions of the characters in the image, the ROIs may then be identified as regions of the image that contain one or more characters grouped together. Performing character recognition is performed after ROIs are identified, as described further herein.

The processor 108 then determines a position of each ROI in the image at 606. To determine a position of each ROI, the processor 108 may determine a centroid pixel 707A-707D for each ROI, as illustrated in FIG. 7. Further, the processor may determine the location of each ROI by determining one or more vertices of each ROI and then determine the position of each ROI from the location of the one or more vertices within the image. Additionally, the position of an ROI may be represented by a convex polygon having vertices and/or a centroid.

The processor 108 determines a geometric shape 712 based on the positions of the centroids 707A-707D of the ROIs 705A-705D at 608. To determine the geometric shape 712, the processor 108 may determine that the centroids 707A-707D of the ROIs 705A-705D are positioned along an arc, and the processor 108 may determine that the geometric shape 712 is a circle having a radius of curvature and a center point 714, with each of the ROIs 705A-705D positioned along the circumference of the circle. While illustrated as a circle, the geometric shape 712 may be a horizontal line, a vertical line, a diagonal line, a curve, a jagged line, a sawtooth line, a sinusoid, an ellipse, a two-dimensional convex shape, a polygon, or an open shape. Further, the method may include determining a path that the positions of each of the ROIs 705A-705D lies along. For example, the path may be the arc, illustrated in FIG. 7, of the geometric shape 712 that the four ROIs 705A-705D are positioned along. In examples, an ROI may be positioned along a path such that a centroid of the ROI is on the path, a vertex of the ROI lies along the path, or another coordinate indicative of the position of the ROI lies along the path.

The processor 108 identifies an orientation classification for each of the one or more ROIs at 610. The orientation classification is indicative of one or more features of an ROI including one or more of a rotational orientation of the indicia in a respective ROI, a position of the ROI relative to the geometric shape 712, a position of the ROI relative to other ROIs, a position and/or orientation of the ROI in the obtained image or relative to other objects/features in the obtained image. The processor 108 may identify the orientation classification based on the determined position of an ROI and the determined geometric shape, or based on the position of the ROI along a path such as a sinusoid or other path determined by the geometric shape 712, as will be discuss in more detail herein with reference to FIG. 9. Further, the orientation classification may further be based on a position of an ROI relative to the FOV and orientation of a camera, or the FOV of the imaging device 104. for example, the orientation classification for an ROI may differ for an ROI in a same pixel position for imaging systems having two different FOVs. Additionally, knowing the FOV and orientation of the imaging system FOV allows for the transformation of an ROI position from one imaging to another imaging system having a different FOV, which allows for the comparison of ROIs across imaging systems having different FOVs or an imaging system that employs multiple cameras having different FOVs. For example, an imaging system may include two cameras both imaging a same object of interest, with one camera above the object, and the other camera imaging the side of the object. Both may capture one or more ROIs containing indicia, and the orientation classifications of the ROIs may be determined based on the different FOVs of the two different cameras in the imaging system.

The processor 108 then identifies one or more geometric transformations for each ROI at 612. The processor 108 determines the geometric transformations for each ROI based on the respective orientation classification for a given ROI. For example, the determined geometric transformations may include one or more of a rotation, resize, a horizontal flip, a vertical flip, a mirror (horizontal, vertical, diagonal, etc.), a skew, a perspective transformation, or another geometric transformation. The processor 108 then performs image processing and transforms each ROI according to the determined respective transformations at 614. Each transformed ROI may be referred to herein as a perspective normalization of each ROI, with each perspective normalization being an image on which OCR can effectively identify characters and symbols contained therein. FIGS. 8A-8D illustrate example transformed ROIs and the resultant perspective normalization images of the four regions of interest 405A-405D of FIG. 4. Characters and symbols in the ROIs presented in FIGS. 8A-8D are readily identified using OCR as compared to the characters illustrated in the ROIs of FIGS. 5A-5D.

The processor 108 performs indicia recognition on each ROI at 616. The processor may employ OCR to perform the indicia recognition. In examples, the processor may apply a deep neural network model, or another machine learning method, to perform the indicia recognition in the ROIs. Once the indicia recognition has been performed, the processor 108, a user, or another system may determine information about the tire 410 from the identified characters and indicia.

Figure 9:
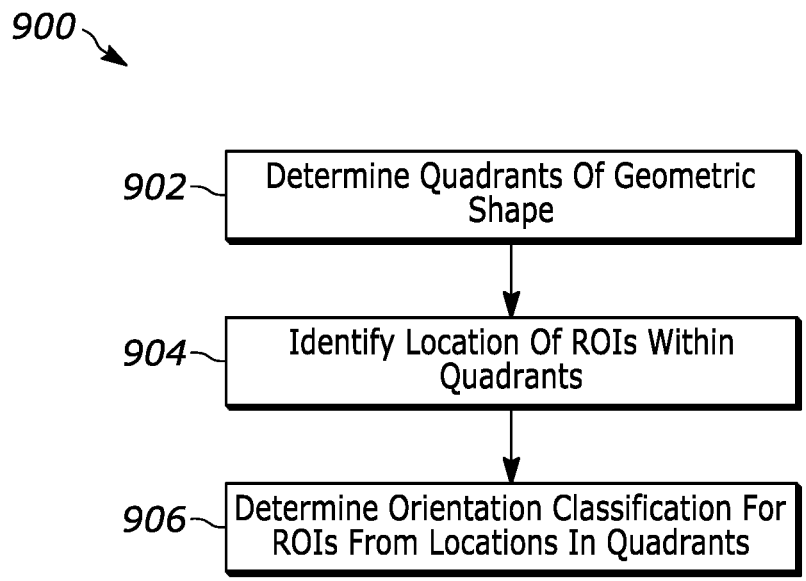
FIG. 9 is a flow diagram of a method for determining orientation classifications, identifying orientation classifications, and identifying image transformations for performing indicia recognition for an imaging system.
Figure 10:
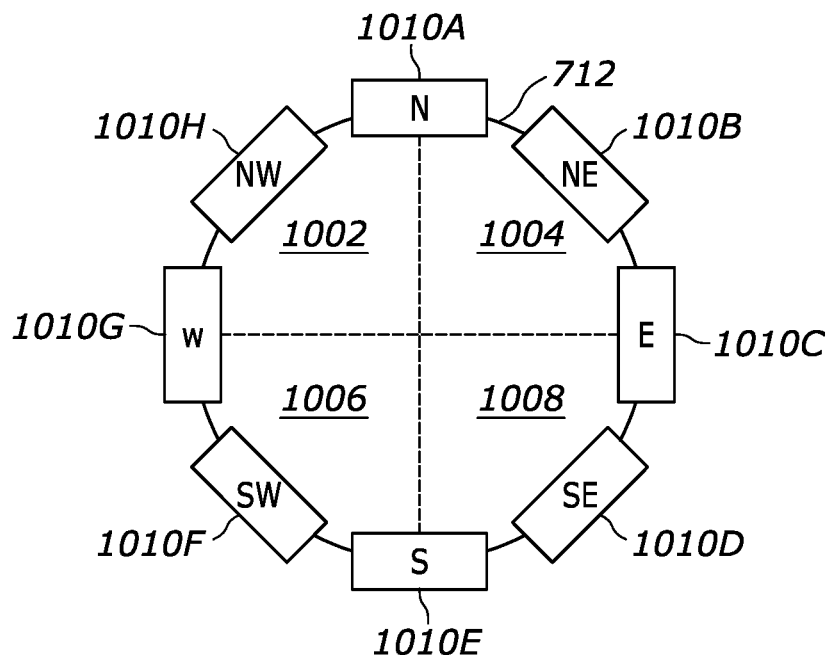
FIG. 10 illustrates the geometric shape of FIG. 7 having quadrants for determining and identifying orientation classifications for regions of interest.

FIG. 9 is a flow diagram of a method 900 for determining orientation classifications and identifying orientation classifications at block 610 of the method 600. FIG. 10 illustrates the geometric shape 712 having quadrants 1002, 1004, 1006, and 1008 for determining and assigning orientation classifications to the regions of interest 705A-705D of FIG. 7. For clarity, the method 900 of FIG. 9 will be described with reference to FIG. 10. The method 900 includes determining quadrants of the geometric shape 712 at 902. In the illustrated example, four quadrants are determined for the geometric shape 712: a northwest quadrant 1002, a northeast quadrant 1004, a southwest quadrant 1006 and a southeast quadrant 1008.

The processor 108 then identifies the locations of ROIs within the quadrants at 904. For example, each of the ROIs of the tire 410 of FIG. 4 are identified as being in the southwest quadrant 1006. The processor then determines the orientation classification from the locations of the ROIs within the quadrants with the orientation classification being a label of which quadrant the ROI is in. For example, the orientation classification may be a number such as 1, 2, 3, or 4 that is indicative of the ROI being in the northwest quadrant 1002, northeast quadrant 1004, southwest quadrant 1006 or southeast quadrant 1008 respectively. In examples, a position of each ROI along the arc of the geometric shape, or along a path as previously described, may be determined and the orientation classification may be identified by the position of each ROI along the path.

Each of the quadrants 1002, 1004, 1006, and 1008, may require different sets of transformations for generating perspective normalized images from a determined ROI. The orientation classification is therefore indicative of one or more transformations that may be used to transform the ROI into a perspective normalized image. For example, an image of indicia in the southwest quadrant 1006, assigned an orientation classification of 3, may require a horizontal flip, a vertical flip, and a rotation according to the location of the ROI within the southwest quadrant 1006, while an image of an ROI from the northeast quadrant 1004 may only require a 45° counter-clockwise rotation. Further, each quadrant may be split into subregions to further identify the location or position of an ROI in a quadrant. The subregions may be used for identifying the set of transformations required for transforming the image of an ROI to a perspective normalized image. For example, the subregion locations of the geometric shape 712 may include a north subregion 101A, northeast subregion 1010B, east subregion 1010C, southeast subregion 1010D, south subregion 1010E, southwest subregion 1010F, west subregion 1010G, and a northwest subregion 1010H. Further, the orientation classification for a given subregion may include a numeral of 1-10, or character A-H to classify the position of the ROI relative to the geometric shape 712 Each subregion may require different transformations for forming the perspective normalized image. For example, a ROI in the west subregion may indicate that a 90° clockwise rotation is required to form the perspective normalized image, while the south region may indicate that a vertical flip, and a horizontal flip are required to form the perspective normalized image, even though both subregions exist, at least partially, in the southwest quadrant 1006. While illustrated as having four quadrants 1002, 1004, 1006, and 1008, and eight subregions 1010A, 1010B, 1010C, 1010D, 1010D, 1010E, 1010F, 1010G, and 1010H, the circle may be segmented into any number of regions for identifying the orientation of an ROI, and further for determining one or more transformations for transforming an ROI into the perspective normalized image for performing character recognition. Further, while illustrated as a circle, the geometric shape 712 may be another shape or line, such as a sinusoidal curve that is split into segments of arcs of the sinusoid for identifying orientations of ROIs, and further identifying image transformations for generating perspective normalized images from the ROIs.

Figure 11A:
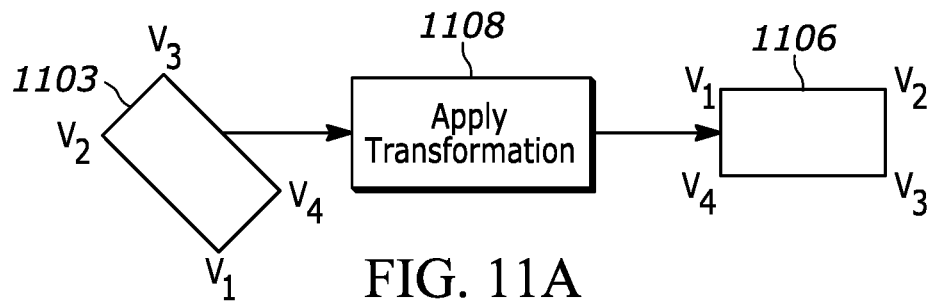
FIG. 11A illustrates a region of interest having four vertices, and further illustrates a perspective normalized image of the region of interest for performing indicia recognition.

FIG. 11A illustrates a ROI 1103 having vertices V1-V4 and a perspective normalized image 1106 of the ROI 1103 after applying a transformation 1108. The vertices V1-V4 may be used to determine the position and orientation of the ROI 1103. For example, the ROI 1103 may be identified as being in the southwest quadrant 1006 of the geometric shape 712 of FIG. 10. Further, the position of the ROI 1103 may be determined before determining how to label the vertices V1-V4. In the illustrated example, the ROI 1103 is determined to be in the southwest quadrant 1006 of the geometric shape 712, and more specifically, in the southwest subregion 1010F. The transformation 1108 is determined to include a clockwise rotation of the ROI that results in V1 being in the top left corner of the perspective normalized image 1106 with V2 being horizontally aligned with V1, and V3 being vertically aligned with V1. A rotation of the ROI is one example of a transformation that may transform the ROI 1103 to the perspective normalized image 1106. For example, the transformation 1108 may include a counter-clockwise rotation that results in V1 being in the bottom right corner, with V2 being horizontally aligned with V1, and V4 being vertically aligned above V1, and then performing a vertical and horizontal flip of the ROI 1103 to form the perspective normalized image 1106. The example of FIG. 11A is for illustrative purposes of using vertices for transforming an image of an ROI to a perspective normalized image for performing indicia recognition. It should be understood that the ROI 1103 may be another shape other than a rectangle having 3 vertices, 4 vertices, 5 vertices, or more vertices. Further, the ROI may be at any position or orientation along a geometric shape as previously described.

Figure 11B:
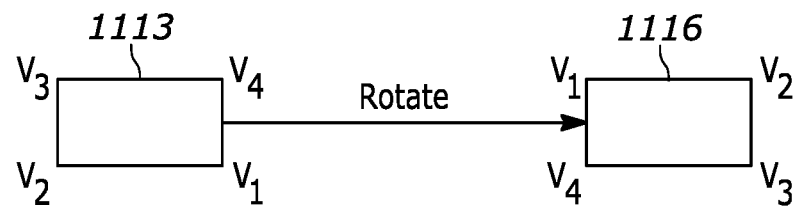
FIG. 11B illustrates a region of interest having four vertices in an orientation requiring a rotation to generate a perspective normalized image.
Figure 11C:
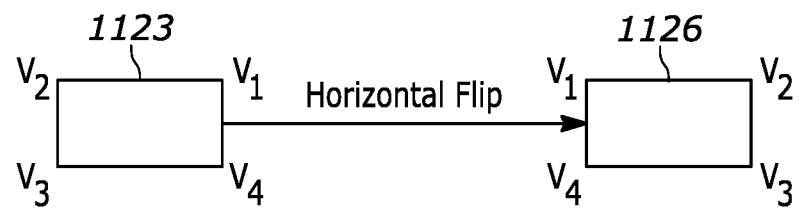
FIG. 11C illustrates a region of interest having four vertices in an orientation requiring a horizontal flip to generate a perspective normalized image.

FIG. 11B illustrates an ROI 1113 having vertices V1-V4. The ROI 1113 of FIG. 11B is in an orientation that requires a rotation of 180° to generate a perspective normalized image 1116 of the ROI. The disclosed method may determine an order of the vertices from the top left vertex V3 clockwise of (V3, V4, V1, V2) and the rotation of 180° results in a vertex orientation of (V1, V2, V3, V4) from the top left moving clockwise. Therefore, as illustrated in FIG. 11B, an order of vertices may be determined for an ROI based on the orientation classification of the ROI, and transformations may be identified based on the order of vertices. FIG. 11C illustrates another ROI 1123 having vertices orientations of (V2, V1, V4, V3) which requires a horizontal flip to transform the vertices into the perspective normalized order of (V1, V2, V3, V4) to generate the perspective normalized image 1126. The orientation classification may be used to determine the specific vertices orientation of an ROI and then the required transformations may be identified to transform the vertex order to the perspective normalized order of (V1, V2, V3, V4) as illustrated in FIGS. 11A-11C. While illustrated in FIGS. 11B and 11C as a rotation and horizontal flip, it should be recognized that the transformations performed may be any geometric transformation for generating a perspective normalized image of an ROI.

Figure 12:
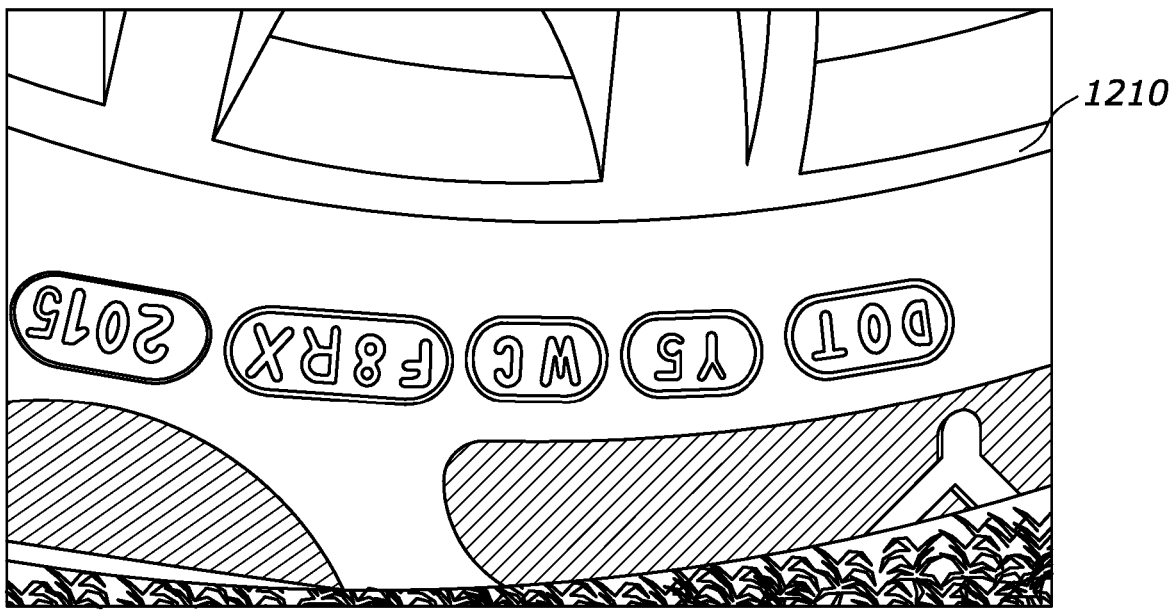
FIG. 12 illustrates a tire having a tire identification number that includes five regions of interest having varying numbers of characters and character orientations in each region of interest.
Figure 13A:
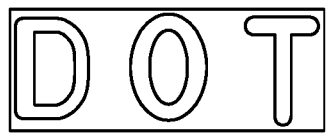
FIG. 13A illustrates a normalized perspective images of the first region of interest in FIG. 12.
Figure 13B:
FIG. 13B illustrates a normalized perspective images of the second region of interest in FIG. 12.
Figure 13C:
FIG. 13C illustrates a normalized perspective images of the third region of interest in FIG. 12.
Figure 13D:
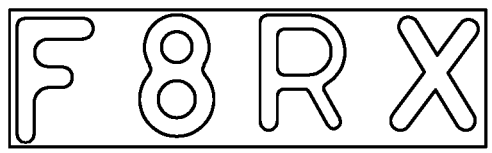
FIG. 13D illustrates a normalized perspective images of the fourth region of interest in FIG. 12.
Figure 13E:
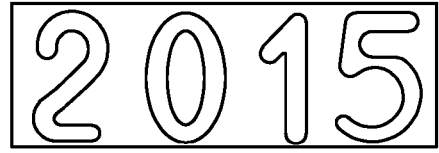
FIG. 13E illustrates a normalized perspective images of the fifth region of interest in FIG. 12.

FIG. 12 illustrates a tire having a TIN that includes five ROIs having varying numbers of characters in the ROIs. The ROIs of FIG. 12 are at different orientations and positions than the tire 410 in the example of FIG. 4. Further, the ROIs of FIG. 12 traverse two different quadrants of the circular geometric shape 712 of FIG. 10. The disclosed methods for performing indicia identification were performed on the ROIs of FIG. 12 and FIGS. 13A-13E illustrate normalized perspective images of the ROIs of FIG. 12. The example of FIG. 12 illustrates the robust ability of the described methods and system to identify a plurality of ROIs at various positions and orientations without limitations of conventional machine vision systems. For example, the disclosed methods may identify one ROI, two ROIs, three ROIs, or more ROIs, with each ROI being at a different orientation and/or position in an image. The methods further identify transformations for each respective ROI for generating perspective normalized images of each ROI, and then identifies characters and indicia contained in each ROI.

The disclosed method and system are capable of achieving character recognition accuracies of greater than 90%, with examples of recognition accuracy of 96% on 503 test runs, for images having characters at arbitrary angular orientations and arbitrary positions in the images. Conventional character recognition methods had a recognition accuracy of 30.6% for the same set of test images. As such, the disclosed method and system are able to identify indicia at arbitrary orientations and positions in obtained images, which is unable to be done in typical machine vision systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of performing indicia recognition for an imaging system, the method comprising:
    obtaining, by an imaging assembly, an image of an object of interest;
    identifying, by a processor, one or more regions of interest in the image, each region of interest including one or more indicia indicative of a characteristic of the object of interest;
    determining, by the processor, positions of each of the one or more regions of interest in the image;
    determining, by the processor, a geometric shape from the determined positions of the one or more regions of interest;
    identifying, by the processor, an orientation classification of each of the one or more regions of interest, the orientation classification being identified based on the (i) determined positions and (ii) determined geometric shape;
    identifying, by the processor, a geometric transformation for each of the regions of interest based on each orientation classification and transforming, by the processor, each of the one or more regions of interest according to the geometric transformation for the identified orientation classification to provide a perspective normalization for each of the one or more regions of interest; and
    responsive to the transforming, performing, by the processor, indicia recognition on each of the one or more regions of interest,
    wherein identifying the one or more regions of interest in the image comprises determining, by the processor, the one or more regions of interest from locations of identified indicia in the image.

2. The method of claim 1, wherein the positions of each of the one or more regions of interest are determined by a centroid of each of the one or more regions of interest.

3. The method of claim 1, wherein the positions of each of the one or more regions of interest are determined by one or more vertices of each region of interest.

4. The method of claim 1, wherein the geometric shape comprises a shape selected from the group consisting of a circle, an ellipse, an arc, a two-dimensional convex shape, and a polygon.

5. The method of claim 1, wherein identifying an orientation classification for each of the one or more regions of interest comprises:
    determining, by the processor, a plurality of quadrants of the geometric shape;
    identifying, by the processor, the location of each of the one or more regions of interest within a respective quadrant; and
    determining, by the processor, the orientation classification for each of the one or more regions of interest from the identified locations of the one or more regions of interest in respective quadrants.

6. The method of claim 1, further comprising, determining a path, the path being determined by the geometric shape, and wherein the position of each ROI lies along the path, and wherein the orientation classification is further identified by the position of each ROI along the path.

7. The method of claim 1, wherein identifying one or more regions of interest comprises:
    determining, by the processor, the presence of one or more characters in the image; and
    determining, by the processor, the one or more regions of interest from a position of the one or more characters in the image.

8. The method of claim 1, wherein the orientation classification is identified based on a position of the region of interest in a field of view of the imaging assembly.

9. The method of claim 1, wherein the one or more identified transformations includes one or more of a resize, vertical flip, horizontal flip, skew, rotation, or perspective transformation.

10. The method of claim 1, wherein identifying one or more regions of interest in the image further comprises applying, by the processor, a deep neural network model to identify indicia in the image.

11. The method of claim 1, wherein performing indicia recognition on each of the one or more regions of interest comprises performing, by the processor, text recognition by applying a deep neural network model.

12. The method of claim 1, wherein the indicia includes one or more of an alphabetical character, a number, an alphanumeric string, a one-dimensional barcode, a two-dimensional barcode, a QR code, a static barcode, a dynamic barcode, a vehicle identification number, or an expiration date.

13. An imaging system for performing indicia recognition, the system comprising:
an imaging assembly disposed to (i) receive light from a target and (ii) generate a signal indicative of the received light;
a processor and non-transitory computer-readable media storing machine readable instructions that, when executed, cause the imaging system to:
obtain, by the imaging assembly, an image of an object of interest;
identify, by the processor, one or more regions of interest in the image, each region of interest including one or more indicia indicative of the object of interest;
determine, by the processor, positions of each of the one or more regions of interest in the image;
determine, by the processor, a geometric shape from the determined positions of the one or more regions of interest;
identify, by the processor, an orientation classification to each of the one or more regions of interest, the orientation classification being identified based on the (i) determined positions and (ii) determined geometric shape;
identify, by the processor, a geometric transformation for each of the regions of interest based on each of the identified orientations;
transform, by the processor, each of the one or more regions of interest according to the geometric transformation for the identified orientation classification to provide a perspective normalization for each of the one or more regions of interest; and
perform, by the processor and responsive to the transformation, indicia recognition on each of the one or more regions of interest,
wherein to identify the one or more regions of interest in the image, the machine readable instructions further cause the imaging system to determine, by the processor, the one or more regions of interest from locations of identified indicia in the image.

14. The system of claim 13, wherein to determine positions of each of the one or more regions of interest the machine readable instructions further cause the imaging system to:
determine, by the processor, a centroid of each of the one or more regions of interest; and
determine, by the processor, the positions of each of the one or more regions of interest from the centroid of each region of interest.

15. The system of claim 13, wherein to determine positions of each of the one or more regions of interest the machine readable instructions further cause the imaging system to:
determine, by the processor, one or more vertices of each region of interest; and
determine, by the processor, the positions of each of the one or more regions of interest from the one or more vertices of each region of interest.

16. The system of claim 13, wherein the geometric shape comprises a shape selected from the group consisting of a circle, an ellipse, an arc, a two-dimensional convex shape, and a polygon.

17. The system of claim 13, wherein to identify an orientation classification for each of the one or more regions of interest, the machine readable instructions further cause the imaging system to:
determine, by the processor, a plurality of quadrants of the geometric shape;
identify, by the processor, the location of each of the one or more regions of interest within a respective quadrant; and
determine, by the processor, the orientation classification for each of the one or more regions of interest from the identified locations of the one or more regions of interest in respective quadrants.

18. The system of claim 13, further wherein the machine readable instructions further cause the imaging system to determine, by the processor, a path from the geometric shape, wherein the position of each region of interest lies along the path, and wherein to identify an orientation classification of the one or more regions of interest, the machine readable instructions further cause the imaging system to determine, by the processor, the orientation classification from the position of each region of interest along the path.

19. The system of claim 13, wherein to identify one or more regions of interest, the machine readable instructions cause the imaging system to:
determine, by the processor, the presence of one or more characters in the image; and
determine, by the processor, the one or more regions of interest from a position of the one or more characters in the image.

20. The system of claim 13, wherein the orientation classification is further based on a position of the region of interest in a field of view of the imaging assembly.

21. The system of claim 13, wherein the one or more identified transformations includes one or more of a resize, vertical flip, horizontal flip, skew, rotation, or perspective transformation.

22. The system of claim 13, wherein to identify one or more regions of interest in the image, the machine readable instructions further cause the imaging system to apply, by the processor, a deep neural network model to identify indicia in the image.

23. The system of claim 13, wherein to perform indicia recognition on each of the one or more regions of interest, the machine readable instructions further cause the imaging system to perform, by the processor, text recognition by applying a deep neural network model.

24. The system of claim 13, wherein the indicia includes one or more of an alphabetical character, a number, an alphanumeric string, a one-dimensional barcode, a two-dimensional barcode, a QR code, a static barcode, a dynamic barcode, a vehicle identification number, or an expiration date.

* * * * *